United States Patent
Howald et al.

(10) Patent No.: US 7,042,840 B2
(45) Date of Patent: May 9, 2006

(54) METHOD AND APPARATUS FOR SUMMING ASYNCHRONOUS SIGNAL SAMPLES IN A CABLE TELEVISION DIGITAL RETURN PATH

(75) Inventors: Robert Landis Howald, Chalfont, PA (US); Sean Gallagher, Wyndmoor, PA (US); Ted Booth, Sellersville, PA (US)

(73) Assignee: General Instrument Corporation, Horsham, PA (US)

( * ) Notice: Subject to any disclaimer, the term of this patent is extended or adjusted under 35 U.S.C. 154(b) by 1005 days.

(21) Appl. No.: 09/873,798

(22) Filed: Jun. 4, 2001

(65) Prior Publication Data
US 2002/0018145 A1 Feb. 14, 2002

Related U.S. Application Data

(60) Provisional application No. 60/209,083, filed on Jun. 2, 2000.

(51) Int. Cl.
*H04L 12/26* (2006.01)

(52) U.S. Cl. ................................. 370/229; 370/506

(58) Field of Classification Search ........ 370/352–358, 370/503, 429, 468, 442, 488, 516, 443, 229, 370/235, 253, 506, 504, 505, 507, 509, 510, 370/511, 512, 513, 514, 518, 520; 375/222, 375/371; 725/111
See application file for complete search history.

(56) References Cited

U.S. PATENT DOCUMENTS

| | | | |
|---|---|---|---|
| 4,006,314 A | 2/1977 | Condon et al. | 179/15 |
| 5,119,093 A | 6/1992 | Vogt et al. | 341/123 |
| 5,245,667 A | 9/1993 | Lew | 381/94 |
| 5,513,209 A | 4/1996 | Holm | 375/354 |
| 6,061,410 A | 5/2000 | Linz | 375/371 |
| 6,765,931 B1* | 7/2004 | Rabenko et al. | 370/493 |

* cited by examiner

FOREIGN PATENT DOCUMENTS

WO  WO 99/35876  7/1999

OTHER PUBLICATIONS

S. Bregni, "A Historical Perspective on Telecommunications Network Synchronization," IEEE Communications Magazine, IEEE Service Center, Piscataway, NJ, vol. 36, No. 6, Jun. 1, 1998, pp. 158-166.

*Primary Examiner*—Brenda Pham
(74) *Attorney, Agent, or Firm*—Lawrence T. Cullen

(57) ABSTRACT

A method and apparatus for digitizing multiple data streams having different clocks spreads an error due to clock drift is spread across many clock cycles in extremely small amounts. To combine two data streams, the method interpolates one or more samples between existing samples of one of the two data streams and then adjusts a number of samples of said one of the two data streams to maintain balance in a downstream synchronizing buffer. This occurs prior to combining the two data streams. The adjusting may be performed by adding or decimating samples from the interpolated samples. To combine two asynchronous data streams having clocks offset in frequency, first, a first data stream is clocked into and out of a first buffer using a first clock associated with the first data stream. Second, a second data stream is clocked into a second buffer using a second clock associated with the second data stream and clocking the second data stream out of the second buffer using the first clock. Third, samples are interpolated into and decimated from samples of the second data stream prior to clocking the second data stream into the second buffer based on an overflow or underflow of the second buffer. Finally, the outputs of the first and second buffers are combined.

22 Claims, 3 Drawing Sheets

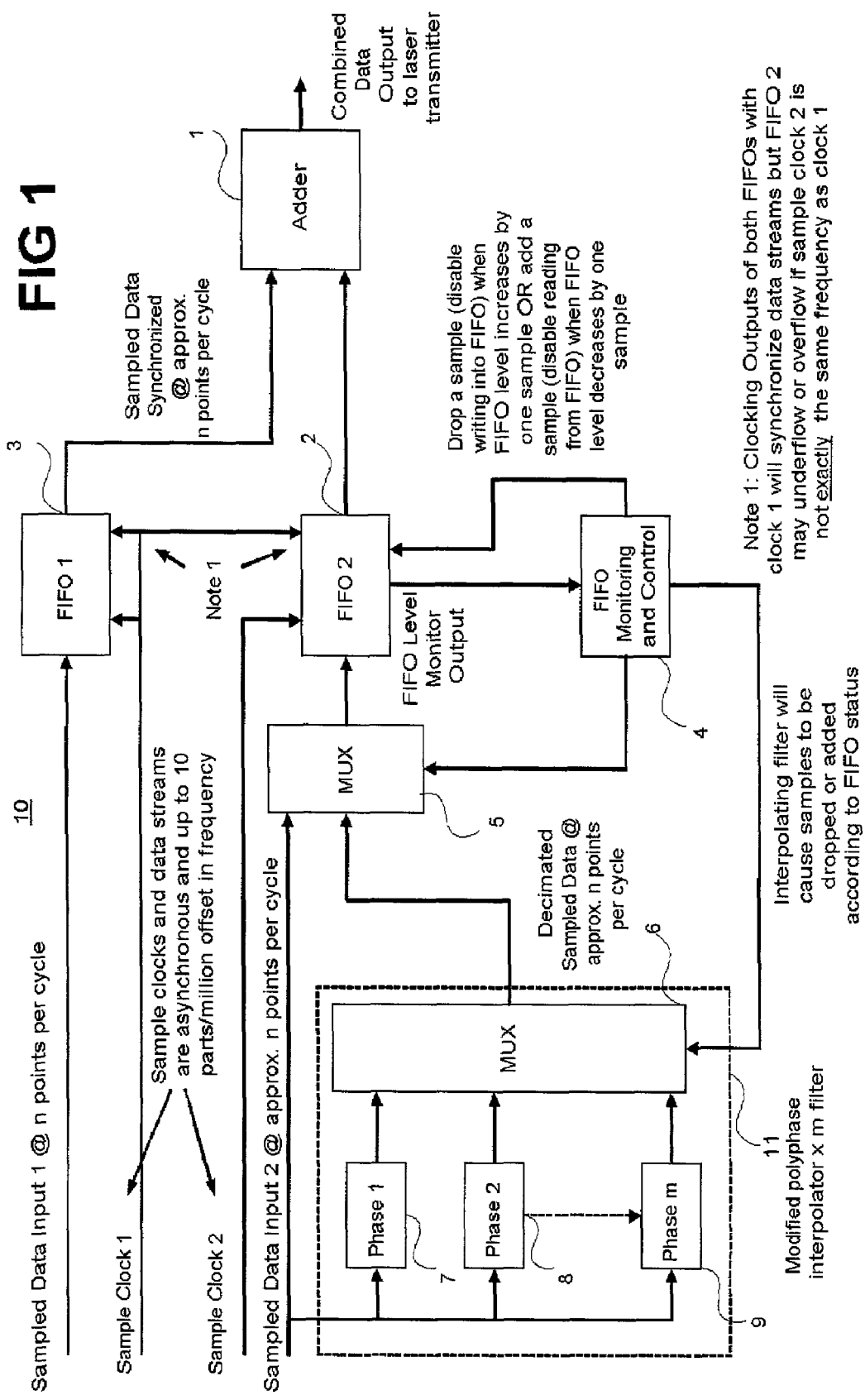

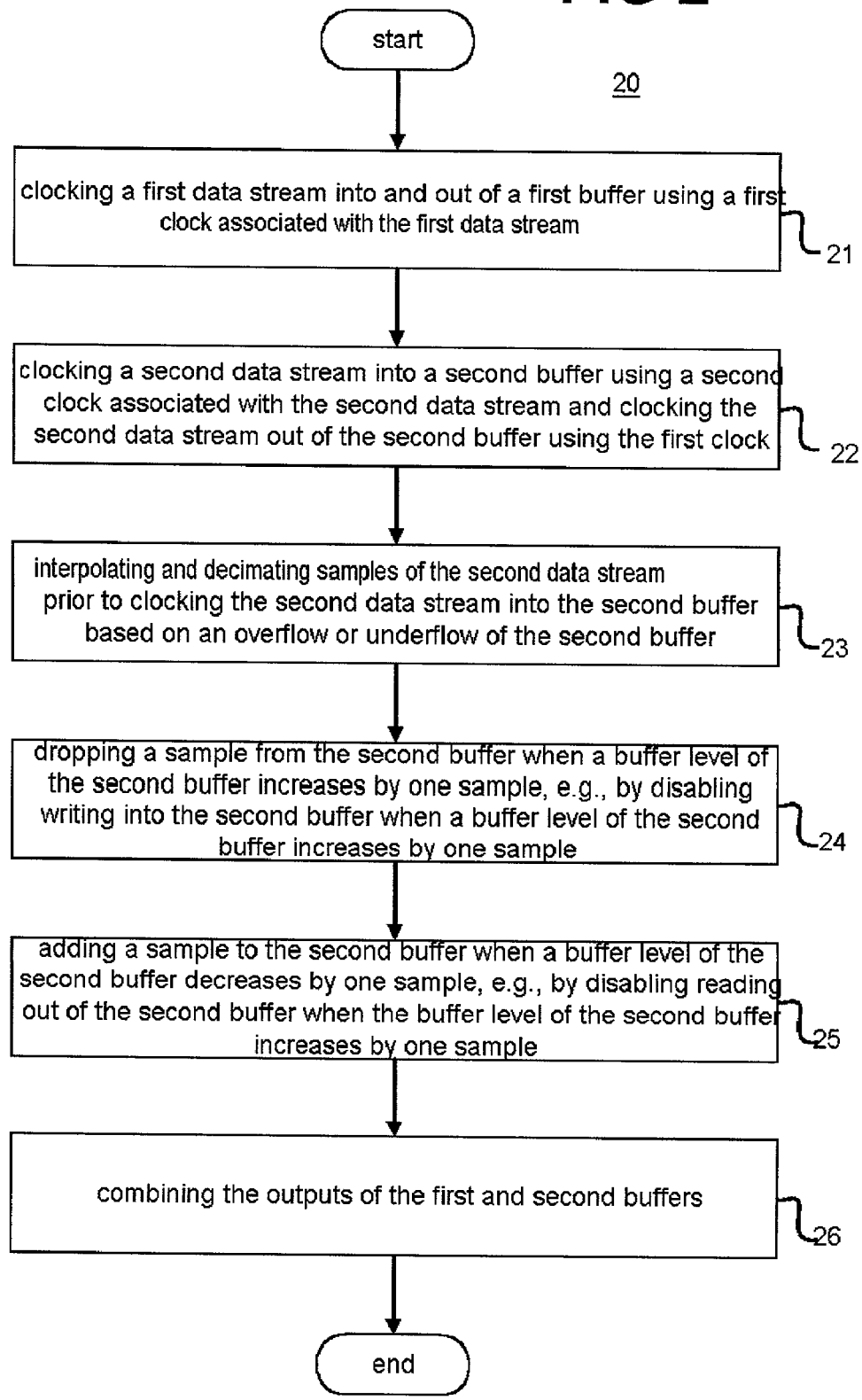

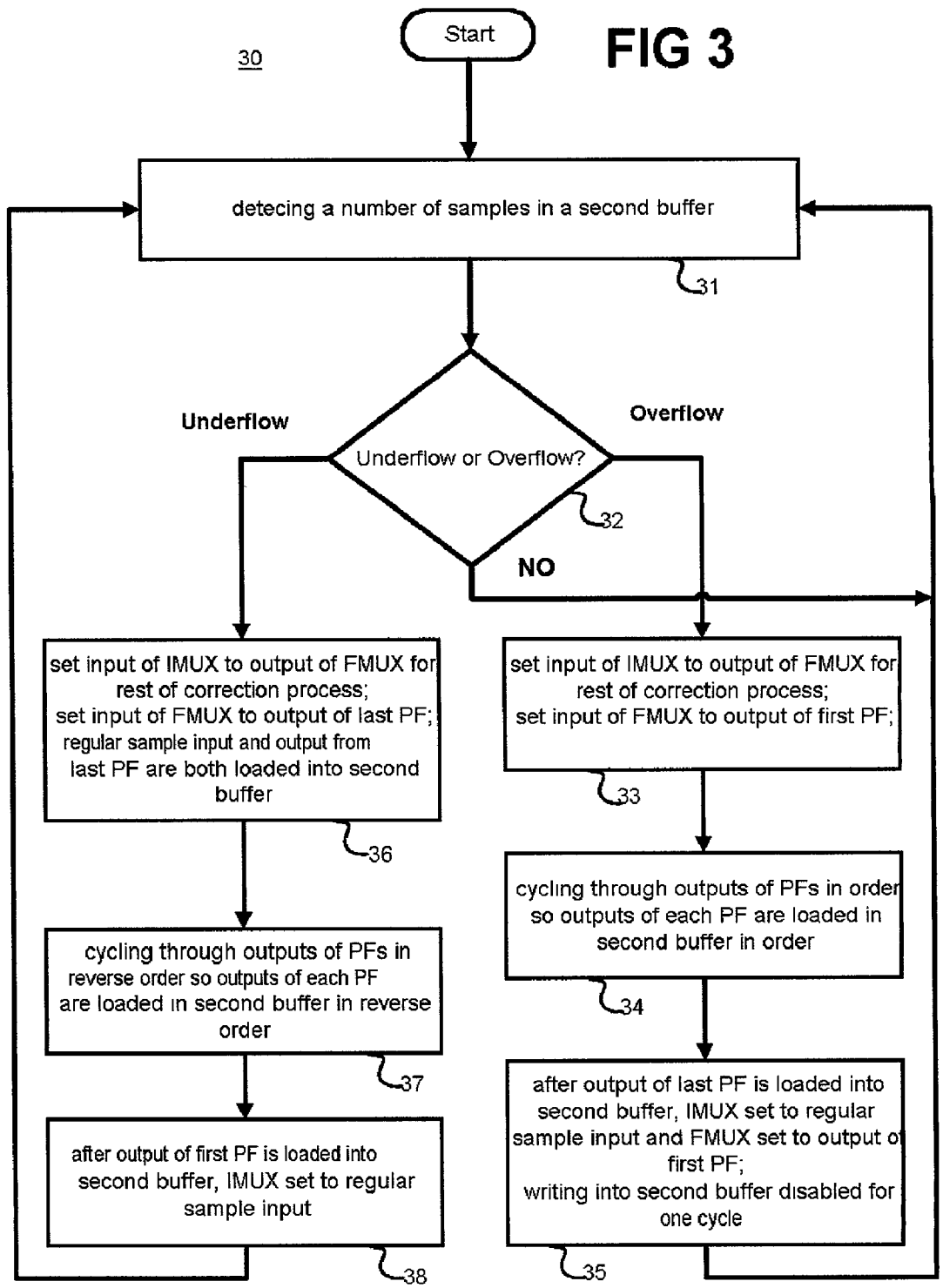

METHOD AND APPARATUS FOR SUMMING ASYNCHRONOUS SIGNAL SAMPLES IN A CABLE TELEVISION DIGITAL RETURN PATH

CROSS-REFERENCE TO RELATED APPLICATIONS

The present invention is related to U.S. Provisional application No. 60/209,083 filed Jun. 2, 2000, which is incorporated herein by reference in its entirety.

BACKGROUND OF THE INVENTION

The present invention relates generally to methods and apparatuses for digitizing multiple data streams, and more particularly to a method and apparatus for digitizing multiple data streams that are geographically diverse.

Advances in analog to digital converters (A/Ds) have made transmission of the digitized analog RF return path in a Hybrid Fiber-Coax (HFC) cable system an attractive alternative to analog transmission because digital transmission relaxes the requirement for expensive linear transmit lasers. Moreover, modern digital signal processing (DSP) techniques that are embodied in reconfigurable digital hardware devices, which are known as field programmable gate arrays (FPGAs), can perform processing tasks that were previously relegated to RF devices. Examples of such functions include, inter alia, signal adding, filtering, channelizing and demodulating. While analog signal processing functions have a digital counterpart, the digitization process introduces additional flexibility and tradeoffs that do not have an analog counterpart. Simple examples would be digital word length (e.g., a number of bits/sample) and sample rate.

Once major issue exists that is peculiar to the digital return path of an HFC system. In such a system, the RF return path could be digitized in the node and then transmitted digitally to the Hub and/or Head-end. A problem occurs when two or more digitized signal streams from different nodes are to be added together, particularly if the nodes are geographically diverse, and hence are subject to different maintenance schedules and environmental conditions. Ideally, two signal streams would be sampled at identical sample rates and thus be synchronized prior to being summed.

While each node would have identical sampling clock frequencies generated from a crystal oscillator, oscillators suitable from a performance and economic standpoint for HFC may drift up to five parts per million over time and temperature. For a 100 MHz oscillator that would be used in a 5–40 MHz return path, this would be equivalent to an oscillator whose actual frequency range could range from 99.995 MHz to 100.005 MHz. The worst-case difference between two digital data streams that are to be added would be as much as 10 kHz.

Once must then consider how long it would take the synchronizing first-in-first-out (FIFOs) to underflow or overflow because of the sample rate difference between the two data streams. Using the numbers above, this can be shown to be in the 1–2 msec range, depending upon the size of the FIFO buffers. This would result in the loss of return path data approximately every millisecond, which results in unacceptable performance.

To keep the FIFOs balanced (i.e., the input data rate equals to the output data rate out), one could periodically drop a sample from the input of the FIFO to keep it from overflowing or periodically repeat a sample at the output of the FIFO to keep it from underflowing. However, unless the original RF signals are highly over sampled (by orders of magnitude), periodically dropping or adding samples will introduce an unacceptably high distortion level such that the data will be excessively degraded. Current 10-bit A/Ds can be clocked up to 105 MHz, which is sufficient to satisfy the Nyquist sampling theory, but far less than the orders of magnitude needed when sampling a 5 MHz to 40 MHz return band.

The present invention is therefore directed to the problem of developing a method and apparatus for digitizing multiple data streams whose clocks may vary due to oscillator drift.

SUMMARY OF THE INVENTION

The present invention solves these and other problems by providing a method and apparatus for digitizing multiple data streams having different clocks in which an error due to clock drift is spread across many clock cycles in extremely small amounts.

According to one aspect of the present invention, a method for combining two data streams interpolates one or more samples between existing samples of one of the two data streams and then adjusts a number of samples of said one of the two data streams to maintain balance in a downstream synchronizing buffer. This occurs prior to combining the two data streams. The adjusting may be performed by adding or decimating samples from the interpolated samples.

According to another aspect of the present invention, an apparatus for combining two data streams includes two buffers, an interpolating filter, a multiplexer, a buffer controller and an adder. A first of the two buffers receives a first data stream of the two data streams and has its input clocked in by a first sample clock associated with the first data stream and has its output clocked out by the first sample clock. The interpolating filter receives the second data stream and outputs a decimated oversampled version of the second data stream. The multiplexer has its first input coupled to an output of the interpolating filter, receives the second data stream at its second input and outputs a modified data stream. A second of the two buffers receives the modified data stream, and has its input clocked in by a second sample clock associated with the second data stream, has its output clocked out by the first sample clock. The second buffer includes a level monitor output. The buffer controller has an input coupled to the level monitor output of the second buffer, has a first output controlling an output of the multiplexer, has a second output controlling the output of the interpolating polyphase filter and has a third output controlling the output of the second buffer. The adder then combines the outputs of the first and second buffer.

According to yet another aspect of the present invention, a method for combining two asynchronous data streams having clocks offset in frequency four steps. First, a first data stream is clocked into and out of a first buffer using a first clock associated with the first data stream. Second, a second data stream is clocked into a second buffer using a second clock associated with the second data stream and clocking the second data stream out of the second buffer using the first clock. Third, samples are interpolated into and decimated from samples of the second data stream prior to clocking the second data stream into the second buffer based on an overflow or underflow of the second buffer. Finally, outputs of the first and second buffers are combined. In addition to the above four steps, a sample from the second buffer may be dropped when a buffer level of the second buffer increases by one sample by, e.g., disabling writing into the second buffer when a buffer level of the second buffer increases by one sample. Moreover, a sample may be added to the second buffer when a buffer level of the second buffer decreases by one sample, e.g., disabling reading out of the second buffer when a buffer level of the second buffer increases by one sample.

BRIEF DESCRIPTION OF THE DRAWINGS

FIG. 1 depicts a block diagram of an exemplary embodiment of an apparatus according to one aspect of the present invention.

FIG. 2 depicts a flow chart of an exemplary embodiment of a method according to another aspect of the present invention.

FIG. 3 illustrates an exemplary embodiment of a correction process in accordance with the invention.

DETAILED DESCRIPTION

It is worthy to note that any reference herein to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

According to one aspect of the present invention, a method is disclosed that allows two data streams to be summed in a manner that results in acceptable degradation from the two different sample rates being slightly offset due to, e.g., normal clock drift. In one sense, the method of the present invention spreads the error due to difference clock drifts across many clock cycles by applying an extremely small amount of error across those many clock cycles rather than one large error over a single clock cycle.

According to one embodiment of the present invention, the method interpolates (i.e., adds more samples between existing samples) one of the two data streams through the use of a modified polyphase, interpolating filter. Samples are then added or dropped as needed to keep a downstream synchronizing buffer (e.g., a FIFO) balanced. As the output of the downstream buffer is clocked by the non-interpolated data stream, balance is achieved by adding or removing samples to or from the interpolated data stream. As a result, the two streams are synchronized for subsequent summation. The interpolated data stream is then decimated (i.e., samples are removed) to the original sample rate and then fed into the synchronizing FIFO. Data is then read from the two FIFOs, summed together, and sent to the fiber optic circuitry for transmission.

FIG. 1 illustrates a block diagram of an exemplary embodiment 10 of an apparatus for performing the data stream synchronization. Sampled data input 1 at n points per cycle is input to FIFO1 3 along with sample clock 1, which is used to clock the data into FIFO1 3 and to clock the data out of FIFO1 3. The output of FIFO1 3 is fed to one input of adder 1, the output of which adder 1 is the combined data that is output to the laser transmitter that is part of the return data path. The output of FIFO1 3 is sampled data at approximately n points per cycle.

Sampled data input 2 is fed into one input of a multiplexer 5 and also into a modified polyphase interpolator×m filter 11. The two sample clocks and data streams are asynchronous and up to 10 parts per million offset in frequency.

The output of the modified polyphase interpolator×m filter 11 is fed to the second input of the multiplexer 5. The output of the modified polyphase interpolator×m filter 11 is decimated sampled data at approximately n points per cycle. The output of multiplexer 5 is fed into FIFO2 2, whose input is clocked in with sample clock 2. The output of FIFO2 2 is clocked out into a second input of adder 1 by sample clock 1, which is also used to clock the out the output of FIFO1 3. Clocking outputs of both FIFO1 3 and FIFO2 2 with clock 1 will synchronize the two data streams but FIFO2 2 may underflow or overflow if sample clock 2 is not exactly the same as clock 1.

The FIFO monitoring and control circuit 4 functions by watching the number of samples in FIFO2 2. As long as the number of samples in FIFO2 2 is between the established upper and lower thresholds, then the monitor circuit 4 is in its normal state. If the number of samples falls below the lower threshold, then the monitor circuit 4 detects an underflow and enables the polyphase filter 11 to add samples until the number of samples in FIFO2 2 is above the lower threshold again. If the number of samples in FIFO2 2 rises above the upper threshold, then the monitor circuit 4 detects an overflow and enables the polyphase filter 11 to drop samples until the number of samples in FIFO2 2 is again below the upper threshold When the FIFO monitoring and control circuit 4 does not detect an overflow or underflow condition, no correction is needed. Therefore, it sets the input multiplexer 5 to allow the data input 2 to flow directly into FIFO2 2.

Turning to FIG. 3, shown therein is an exemplary embodiment of a correction process 30 according to one aspect of the present invention. The process 30 begins by detecting a number of samples in the buffer (step 31). When an overflow is detected in step 32, the monitor circuit 4 enables the polyphase filter 11 to drop a sample. On the first cycle, the input multiplexer (IMUX) 5 is set to input 2 (step 32). The input multiplexer 5 is kept in this state for rest of the correction process. Also in the first cycle, the filter multiplexer (FMUX) 6 is set to input 1 (step 32). This allows the value from the Phase1 filter (PF) 7 to be loaded into FIFO2 2. On the second cycle, the filter multiplexer 6 is set to input 2. This allows the value from the Phase 2 filter 8 to be loaded into FIFO2 2. On each successive cycle, the next higher input of the filter multiplexer 6 is selected so that values from each of the phase filters is loaded into FIFO2 2 (step 33). On cycle 256, the filter multiplexer 6 is set to input 256, and the value from Phase 256 filter 9 is loaded into FIFO2 2 (step 34). On cycle 257, the input multiplexer is set to input 1 and the filter multiplexer 6 is set to input 1 (step 35). Also during cycle 257, the write enable of the FIFO2 2 is disabled so that no value can be written into FIFO2 2 (step 35). At this point, a sample has been dropped and the correction process is complete and the process returns to step 31. On cycle 258, the write enable of FIFO2 2 is enabled and new samples can be loaded. The monitoring circuit 4 will either return to its normal state or, if an overflow condition still exists, then the monitor circuit 4 will again enable the correction process to drop another sample.

When an underflow is detected (step 32), the monitor circuit 4 enables the polyphase filter 11 to add a sample. On the first cycle, the input multiplexer 5 is set to input 2 (step 36). It will stay in this position for the rest of the correction process. Also during the first cycle, the filter multiplexer 6 is set to input 256 (step 36). During this first cycle, the regular sample input and the value from the Phase 256 filter 9 are both loaded into the FIFO2 2 (step 36). This requires a special implementation of FIFO2 2 to allow this ability. On the second cycle, the filter multiplexer 6 is set to input 255 so that the value from the Phase 255 filter is loaded into FIFO2 2 (step 37). On each successive cycle, the next lower input of the filter multiplexer 6 is selected(i.e., the output of the next lower phase filter is selected as the input to the filter multiplexer 6) (step 37). In this way all of the Phase filters are cycled through in reverse order and values of each Phase filter is loaded into FIFO2 2 (step 37). On cycle 256, the filter multiplexer 6 is set to input 1 and the value from Phase 1 filter 7 is loaded into FIFO2 2 (step 37). On cycle 257, the input multiplexer 5 is reset to input 1 (step 38). This completes the correction process and the process returns to step 31. The monitoring circuit 4 will either return to its normal state or, if an underflow condition still exists, then the monitor circuit 4 will again enable the correction process to add another sample.

Interpolating filter 11 includes m phases 7–9, the outputs of which are fed into a multiplexer 6, which provides the output of the interpolating filter 11 to multiplexer 5. An possible implementation uses 256 phases. In essence, interpolating filter adds samples and then decimates samples based on the overflow and underflow of FIFO2 2 to add small amounts of delay over many clock cycles to account for the relative clock drift between sample clock 1 and sample clock 2. The output of interpolating filter 11 is decimated sampled data at approximately n points per cycle.

Interpolation and decimation are well-established techniques for rate matching one data stream to another, hence will not be explained in detail herein. In the text book case, a rate change also implies that the new data stream would be clocked at the higher rate (for the interpolation case), a sample dropped and then the interpolated data stream would be decimated back down to the 100 MHz sample rate.

The techniques described herein do not increase the clock rate because the maximum clock speed of an FPGA is about 120 MHz. In this application, by starting with a 100 MHz sample rate, interpolating by 256 would result in a sample clock rate of 25.6 GHz, an unattainable value. The polyphase filter structure allows us to have 256 new phases of the original 100 MHz data running in parallel.

This presents a new problem, however, as building a 256-polyphase filter would require many FPGA devices (approximately 100). To conserve design size, without loss of performance, an exemplary embodiment of the present invention uses an FIR interpolating filter whose coefficients are stored in RAM that is part of the FPGA device. For interpolation by 256, the embodiment stores 256 sets of coefficients in memory. For an 8-tap FIR interpolating filter, each set would have 8 coefficients. This requires about 30% of the available RAM on a medium size FPGA.

For this embodiment, the modified polyphase filter 11 is changed. Instead of 256 Phase filters and a 256-to-1 multiplexer, the polyphase filter 11 contains one phase filter that can load its coefficients from a RAM. Instead of changing the input of the filter multiplexer 6 to switch from one interpolating phase to the next, the embodiment switches a new set of coefficients into the phase filter.

To keep the system running at real-time speeds without the use of a 25.6 GHz clock, 255 phase delays must be introduced, followed by dropping of a sample, and then decimating. This technique essentially introduces 256 extremely small phase errors that are spread over many clock cycles instead of one big phase error in one clock cycle. In this manner, the phase error introduced is so small that it negligibly impacts performance. For example, if the RF signal being sampled with a 100 MHz A/D is centered at 10 MHz, then there are 10 samples per period. Dropping one sample out of 2560 samples per period is equal to a 0.14 degree (360°/2560 samples) of error—an insignificant value of phase step. Furthermore, this error is spread over a time period associated with the clock offsets. In this way, communication performance from the nodes is not impacted.

FIG. 2 depicts an exemplary embodiment 20 of a method according to another aspect of the present invention. To combine two asynchronous data streams in which the relative clocks are offset in frequency due to normal clock drift by an amount such as 10 parts per million, the two data streams must be synchronized.

To do so, in step 21 the first data stream is clocked into and out of a first buffer using a first clock associated with the first data stream. In step 22, the second data stream is clocked into a second buffer using a second clock associated with the second data stream. The second data stream is then clocked out of the second buffer using the first clock. This synchronizes the two data streams. If little or no offset in frequency existed, this would be sufficient. However, due to the offset, some adjustment is necessary.

In step 23, samples of the second data stream are interpolated and then decimated prior to clocking the second data stream into the second buffer based on an overflow or underflow of the second buffer, which is downstream from the interpolation and decimation process.

In step 24, samples are dropped from the second buffer when a buffer level of the second buffer increases by one sample, e.g., by disabling writing into the second buffer when a buffer level of the second buffer increases by one sample.

In step 25, samples are dropped from the second buffer when the buffer level of the second buffer decreases by one sample, e.g., by disabling reading out of the second buffer when a buffer level of the second buffer increases by one sample.

Finally, in step 26 the outputs of the first and second buffers are combined to provide an input for the return data path.

Thus, the present invention provides an approach for digitally summing geographically diverse data streams, which approach is consistent with the nature of HFC architecture. Unique application of DSP algorithms, and modeling and analysis of performance impacts, show a clear solution to the problem of distributed clocks in an HFC plant. Furthermore, the approach applies to any DSP functionality that is desired to apply to data stream derived from asynchronous clocks.

Although various embodiments are specifically illustrated and described herein, it will be appreciated that modifications and variations of the invention are covered by the above teachings and within the purview of the appended claims without departing from the spirit and intended scope of the invention. For example, while several of the embodiments depict the use of specific data formats and protocols, any formats or protocols may suffice. Moreover, while some of the embodiments describe specific embodiments of computer, clients, servers, etc., other types may be employed by the invention described herein. Furthermore, these examples should not be interpreted to limit the modifications and variations of the invention covered by the claims but are merely illustrative of possible variations.

What is claimed is:

1. A method for combining two data streams, comprising:
   receiving two asynchronous data streams having data rates independent of each other;
   interpolating one or more samples between existing samples of one of the two data streams;

adjusting a number of samples of said one of the two data streams to maintain balance in a downstream synchronizing buffer and combining the one of said two data streams with the other data stream after said adjusting of said one data stream.

2. The method according to claim 1, wherein said adjusting comprises adding or decimating samples from the interpolated samples.

3. The method according to claim 1, further comprising:
   detecting a number of samples in the synchronizing buffer;
   upon detecting a number of samples below a predetermined lower threshold, inputting a regular sample and last phase delayed sample into the synchronizing buffer and then inputting a predetermined number of phase delayed samples in reverse order into the synchronizing buffer; and
   upon detecting a number of samples in the synchronizing buffer above a predetermined upper threshold, inputting a predetermined number of phase delayed samples in order into the synchronizing buffer and then disabling writing into the synchronizing buffer for one cycle.

4. An apparatus for combining two asynchronous data streams comprising:
   a first buffer receiving a first data stream of the two data streams and having an input being clocked in by a first sample clock associated with the first data stream and having an output being clocked out by the first sample clock;
   an interpolating filter receiving the second data stream and outputting a decimated oversampled version of the second data stream;
   a multiplexer having a first input being coupled to an output of the interpolating filter, having a second input receiving the second data stream and outputting a modified data stream;
   a second buffer receiving the modified data stream, having an input being clocked in by a second sample clock associated with the second data stream, having an output being clocked out by the first sample clock and having a level monitor output;
   a buffer controller having an input being coupled to the level monitor output of the second buffer, having a first output controlling an output of the multiplexer, having a second output controlling the output of the interpolating polyphase filter and having a third output controlling the output of the second buffer.

5. The apparatus according to claim 4, wherein the buffer controller monitors a number of samples in the second buffer, and upon detecting a number of samples below a predetermined lower threshold, enables inputting of a regular sample and a last phase delayed sample from the interpolating filter into the second buffer, and enables inputting a predetermined number of phase delayed samples in reverse order into the second buffer; and upon detecting a number of samples in the second buffer above a predetermined upper threshold, enables inputting a predetermined number of phase delayed samples in order into the second buffer and then disables writing into the second buffer for one cycle.

6. The apparatus according to claim 4, further comprising an adder having two inputs being coupled to the outputs of the first and second buffer and providing a combined data output.

7. The apparatus according to claim 4, wherein said buffer controller disables writing into the second buffer by the multiplexer when the buffer level increases by one sample.

8. The apparatus according to claim 4, wherein said buffer controller disables reading out of the second buffer when the buffer level decreases by one sample.

9. The apparatus according to claim 4, wherein said buffer controller causes the interpolating filter to decimate samples when the buffer level increases by one sample.

10. The apparatus according to claim 4, wherein said buffer controller causes the interpolating filter to add samples when the buffer level decreases by one sample.

11. The apparatus according to claim 4, wherein the interpolating filter comprises a plurality of phases (m) each outputting a delayed version the second data stream by successive increments of 360E/m and a multiplexer being coupled to the outputs of the plurality of phases and outputting the decimated oversampled version of the second data stream.

12. The apparatus according to claim 11, wherein said buffer controller controls the output of the multiplexer of the interpolating filter to decimate samples when the buffer level increases by one sample and to add samples when the buffer level decreases by one sample.

13. The apparatus according to claim 4, further comprising a memory and a switch, wherein the interpolating filter comprises a single finite impulse response filter having a plurality of coefficients, said memory storing a plurality (m) of sets of coefficients, one set for each of m phases, and said switch replaces the plurality coefficients for use by the finite impulse response filter as needed for each phase.

14. A method for combining two asynchronous data streams having clocks offset in frequency comprising:
    clocking a first data stream into and out of a first buffer using a first clock associated with the first data stream;
    clocking a second data stream into a second buffer using a second clock associated with the second data stream and clocking the second data stream out of the second buffer using the first clock;
    interpolating and decimating samples of the second data stream prior to clocking the second data stream into the second buffer based on an overflow or underflow of the second buffer; and
    combining the outputs of the first and second buffers.

15. The method according to claim 14, further comprising dropping a sample from the second buffer when a buffer level of the second buffer increases by one sample.

16. The method according to claim 14, further comprising adding a sample to the second buffer when a buffer level of the second buffer decreases by one sample.

17. The method according to claim 14, further comprising disabling writing into the second buffer when a buffer level of the second buffer increases by one sample.

18. The method according to claim 14, further comprising disabling reading out of the second buffer when a buffer level of the second buffer increases by one sample.

19. The method according to claim 14, wherein the step of interpolating and decimating further comprises delaying the second data stream by a plurality of phase delays in parallel and multiplexing the plurality of delays into a single stream.

20. The method according to claim 19, further comprising storing in memory a set of coefficients for each of the plurality of phase delays.

21. The method according to claim 20, further comprising using a single finite impulse response filter to perform the plurality of phase delays and switching between the sets of coefficients stored in memory as needed to provide each phase of the interpolating filter.

22. The method according to claim 14, wherein the step of interpolating and decimating comprises:

detecting a number of samples in the second buffer;

upon detecting a number of samples in the second buffer below a predetermined lower threshold, inputting a regular sample and last phase delayed sample into the second buffer and then inputting a predetermined number of phase delayed samples in reverse order into the second buffer; and upon detecting a number of samples in the second buffer above a predetermined upper threshold, inputting a predetermined number of phase delayed samples in order into the second buffer and then disabling writing into the second buffer for one cycle.

* * * * *